US012375986B2

(12) United States Patent
Thantharate et al.

(10) Patent No.: US 12,375,986 B2
(45) Date of Patent: *Jul. 29, 2025

(54) USER EQUIPMENT (UE) HANDOVER IN WIRELESS COMMUNICATION NETWORKS

(71) Applicant: T-MOBILE INNOVATIONS LLC, Overland Park, KS (US)

(72) Inventors: Anurag Thantharate, Kansas City, MO (US); Sreekar Marupaduga, Overland Park, KS (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 24 days.

This patent is subject to a terminal disclaimer.

(21) Appl. No.: 18/473,810

(22) Filed: Sep. 25, 2023

(65) Prior Publication Data

US 2024/0031902 A1 Jan. 25, 2024

Related U.S. Application Data

(63) Continuation of application No. 17/383,705, filed on Jul. 23, 2021, now Pat. No. 11,805,463.

(51) Int. Cl.
*H04W 36/00* (2009.01)
*H04W 8/24* (2009.01)
(Continued)

(52) U.S. Cl.
CPC ....... *H04W 36/00837* (2018.08); *H04W 8/24* (2013.01); *H04W 36/08* (2013.01);
(Continued)

(58) Field of Classification Search
CPC . H04W 36/32; H04W 8/24; H04W 36/00837; H04W 36/36; H04W 48/18;
(Continued)

(56) References Cited

U.S. PATENT DOCUMENTS 8,229,432 B2 7/2012 Fox et al.
2015/0038143 A1 2/2015 Kilpatrick, II et al.
(Continued)

FOREIGN PATENT DOCUMENTS

WO 2021138526 A1 7/2021

OTHER PUBLICATIONS

"3rd Generation Partnership Project; Technical Specification Group Services and System Aspects; System architecture for the 5G System (5GS); Stage 2; (Release 17)"; 3GPP TS 23.501; Jun. 2021; pp. 1-537; V17.1.1; 3GPP; Sophia Antipolis, France.

*Primary Examiner* — Ashley Shivers

(57) ABSTRACT

A wireless communication network handsover a wireless User Equipment (UE). The wireless communication network selects a network slice for the wireless UE. The wireless communication network selects handover criteria for the wireless UE based on the selected network slice. The wireless communication network serves the wireless UE over a source Radio Access Network (RAN) and the selected network slice. The selected network slice detects a UE handover from the source RAN to a target RAN based on the handover criteria, and in response, the wireless communication network serves the wireless UE over the target RAN and the selected network slice.

20 Claims, 10 Drawing Sheets

(51) Int. Cl.
*H04W 36/08* (2009.01)
*H04W 36/32* (2009.01)
*H04W 36/36* (2009.01)
*H04W 48/18* (2009.01)
*H04W 84/04* (2009.01)

(52) U.S. Cl.
CPC ......... *H04W 36/324* (2023.05); *H04W 36/36* (2013.01); *H04W 48/18* (2013.01); *H04W 84/042* (2013.01)

(58) Field of Classification Search
CPC ........... H04W 84/042; H04W 36/0016; H04W 36/08; H04W 36/324; H04W 36/0033
See application file for complete search history.

(56) References Cited

U.S. PATENT DOCUMENTS

| | | |
|---|---|---|
| 2018/0249513 A1 | 8/2018 | Chang et al. |
| 2019/0028941 A1 | 1/2019 | Zee et al. |
| 2019/0045351 A1 | 2/2019 | Zee et al. |
| 2019/0058997 A1 | 2/2019 | Futaki et al. |
| 2019/0124589 A1* | 4/2019 | Bogineni ............. H04W 48/18 |
| 2019/0239064 A1 | 8/2019 | Stojanovski et al. |
| 2020/0314701 A1 | 10/2020 | Talebi Fard et al. |
| 2021/0099921 A1 | 4/2021 | Han et al. |
| 2021/0160770 A1 | 5/2021 | Zhu et al. |
| 2022/0150783 A1* | 5/2022 | Jin ........................ H04W 48/18 |
| 2023/0058891 A1 | 2/2023 | Fu et al. |
| 2023/0062362 A1 | 3/2023 | Sun et al. |
| 2023/0379775 A1* | 11/2023 | Dauneria ............. H04W 36/13 |

\* cited by examiner

USER EQUIPMENT (UE) HANDOVER IN WIRELESS COMMUNICATION NETWORKS

RELATED CASES

This United States Patent Application is a continuation of U.S. patent application Ser. No. 17/383,705 that was filed on Jul. 23, 2021, now U.S. Pat. No. 11,805,463, and is entitled "USER EQUIPMENT (UE) HANDOVER IN WIRELESS COMMUNICATION NETWORKS." U.S. patent application Ser. No. 17/383,705 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have Radio Access Networks (RANs) which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The RANs exchange network signaling and user data with network elements that are often clustered together into wireless network cores. The RANs are connected to the wireless network cores over backhaul data links.

The RANs comprise Radio Units (RUs), Distributed Units (DUs) and Centralized Units (CUs). The RUs are mounted at elevation and have antennas, modulators, signal processor, and the like. The RUs are connected to the DUs which are usually nearby network computers. The DUs handle lower wireless network layers like the Physical Layer (PHY) and Media Access Control (MAC). The DUs are connected to the CUs which are larger computer centers that are closer to the network cores. The CUs handle higher wireless network layers like the Radio Resource Control (RRC) and Packet Data Convergence Protocol (PDCP). The CUs are coupled to network elements in the network cores. The network cores execute the network elements to provide wireless data services to the wireless user devices over the RANs. Exemplary network elements include the Access and Mobility Management Function (AMF), the Network Slice Selection Function (NSSF), and the Policy Control Function (PCF).

Handover in the wireless communication networks comprises transferring wireless communication service for a wireless user device from a source RAN to a target RAN. The source RAN directs the wireless user device to measure signal strength for the source RAN and for target RANs. The wireless user device measures the received signal strength for the RAN and for the target RANs. The wireless user device determines to handover to one of the target RANs based on the signal strengths. The RAN node notifies the selected target RAN. The source RAN directs the wireless user device to attach to the target access node. The selected target RAN transfers wireless communication service for the wireless user device to the target access node. The wireless user device attaches to the selected target RAN and detaches from the source RAN. Unfortunately, the wireless user device does not effectively and efficiently select target RANs for handover.

Technical Overview

In some examples, a wireless User Equipment (UE) is handed-over. A network slice for the wireless UE is selected. Handover criteria for the wireless UE is selected based on the selected network slice. The wireless UE is served over the selected network slice and a source Radio Access Network (RAN). A UE handover is detected from the source RAN to a target RAN based on the handover criteria, and in response, the wireless UE is served over the selected network slice and the target RAN.

In some examples, a wireless communication network handsover a wireless User Equipment (UE). A network core receives signaling from the wireless UE over a source Radio Access Network (RAN) that indicates a Public Land Mobile Network Identifier (PLMN ID) and a network slice type for the wireless UE. The network core selects a network slice for the wireless UE based on the slice type. The network core selects handover criteria for the wireless UE based on the selected network slice and the PLMN ID. The network core transfers the handover criteria to the wireless UE over the source RAN. The network core directs the selected network slice to serve the wireless UE over the source RAN. The selected network slice serves the wireless UE over the source RAN. The network core detects a UE handover from the source RAN to a target RAN based on the handover criteria, and in response, the network core directs the selected network slice to serve the wireless UE over the target RAN. The selected network slice serves the wireless UE over the target RAN.

In some examples, a wireless communication network handsover a wireless User Equipment (UE). A network controller selects a network slice for the wireless UE. The network controller selects handover criteria for the wireless UE based on the selected network slice. The selected network slice serves the wireless UE over a source Radio Access Network (RAN). The network controller detects a UE handover from the source RAN to a target RAN based on the handover criteria, and in response, the selected network slice serves the wireless UE over the target RAN.

DETAILED DESCRIPTION

Figure 1:
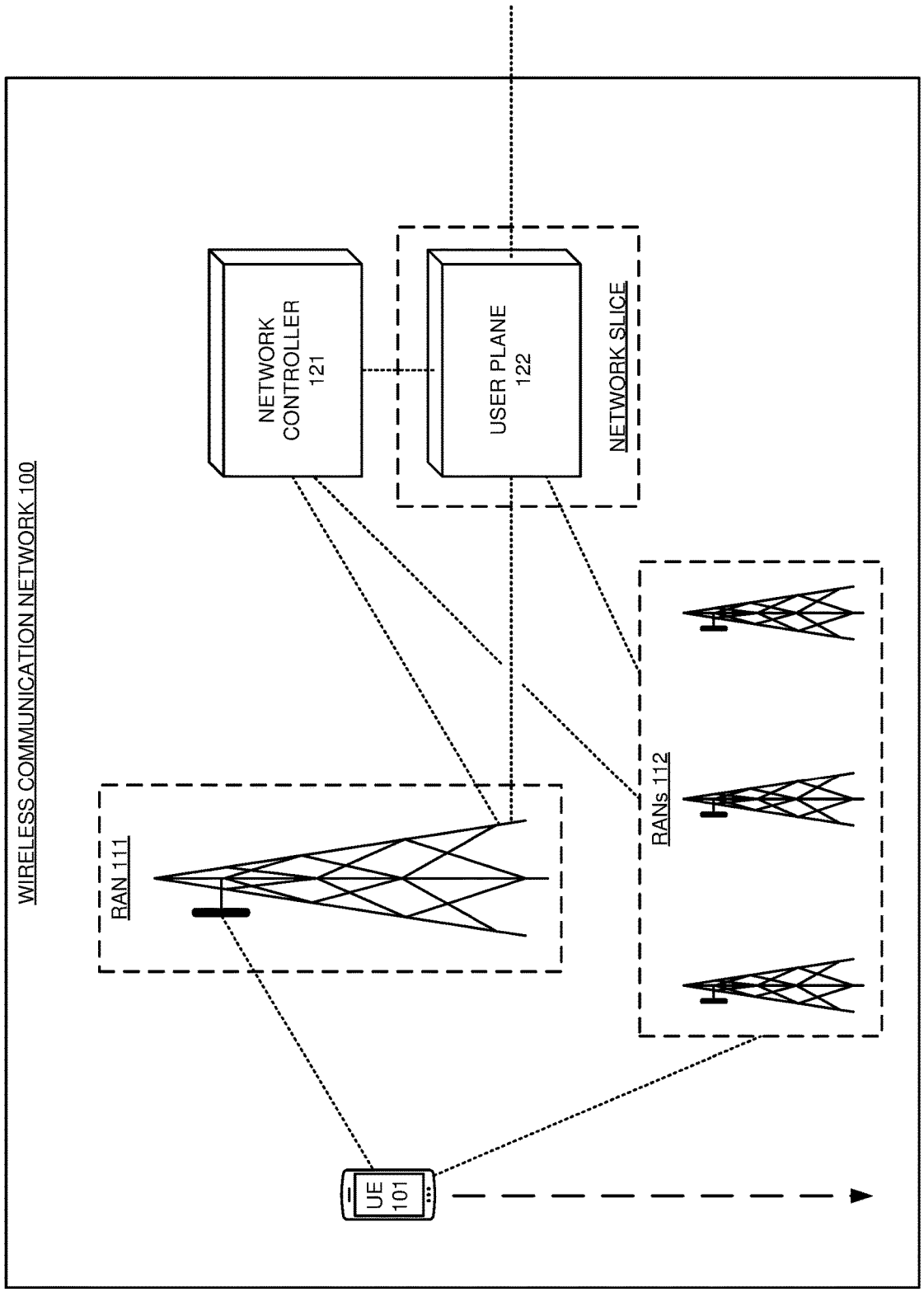
FIG. 1 illustrates a wireless communication network to handover a wireless User Equipment (UE).

FIG. 1 illustrates wireless communication network 100 to handover wireless User Equipment (UE) 101. Wireless communication network 100 delivers services to wireless user devices like internet-access, voice calling, media-streaming, machine communications, or some other wireless communications product. Wireless communication network 100 comprises wireless UE 101, Radio Access Network (RAN) 111, RANs 112, network controller 121, and user plane 122.

Various examples of network operation and configuration are described herein. In some examples, wireless UE 101 wirelessly attaches to network controller 121 over RAN 111. Wireless UE 101 transfers UE capabilities and a slice request to network controller 121 over RAN 111. The UE capabilities comprise a Public Land Mobile Network Identifier (PLMN ID), Radio Access Technology (RAT) type, device type, frequency band, and/or other capability information. Network controller 121 selects a network slice for wireless UE 101 based on the requested slice type in the slice request. For example, network controller 121 may determine if UE 101 is authorized for the requested slice type and if the requested slice type is available to select the network slice. Network controller 121 selects a mobility profile for wireless UE 101 based on the PLMN ID and the selected network slice. The mobility profile comprises handover criteria like thresholds, preferred frequency bands, and preferred RAT types. Network controller 121 transfers the mobility profile to wireless UE 101. Wireless UE 101 exchanges user data with user plane 122 over RAN 111. Wireless UE 101 determines a handover requirement based on the handover criteria. For example, wireless UE 101 may move to another location and determine that the received signal strength for RAN 111 is below a handover threshold. Wireless UE 101 identifies RANs 112 as handover targets. Wireless UE 101 selects one of RANs 112 based on the handover criteria. For example, the handover criteria may indicate a preferred RAT type and wireless UE 101 may select one of RANs 112 that comprises the preferred RAT type. Wireless UE 101 hands over to the selected one RANs 112. Wireless UE 101 exchanges additional user data with user plane 122 over the selected network slice and the selected one of RANs 112. Advantageously, UE 101 effectively and efficiently selects target RANs 112 for handover based on the handover criteria in the mobility profile. Moreover, network controller 121 effectively and efficiently selects the mobility profile for wireless UE 101 based on the capabilities and network slice of wireless UE 101.

Wireless UE 101 and RANs 111-112 communicate over links using wireless technologies like Fifth Generation New Radio (5GNR), Long Term Evolution (LTE), Low-Power Wide Area Network (LP-WAN), Institute of Electrical and Electronic Engineers (IEEE) 802.11 (WIFI), Bluetooth, and/or some other type of wireless networking protocol. The wireless technologies use electromagnetic frequencies in the low-band, mid-band, high-band, or some other portion of the electromagnetic spectrum. RANs 111-112, network controller 121, and user plane 122 communicate over various links that use metallic links, glass fibers, radio channels, or some other communication media. The links use Fifth Generation Core (5GC), IEEE 802.3 (Ethernet), Time Division Multiplex (TDM), Data Over Cable System Interface Specification (DOCSIS), Internet Protocol (IP), General Packet Radio Service Transfer Protocol (GTP), LTE, WIFI, virtual switching, inter-processor communication, bus interfaces, and/or some other data communication protocols.

Wireless UE 101 comprises a computer, phone, vehicle, sensor, robot, or another type of data appliance with wireless communication circuitry. RANs 111-112 are depicted as towers but may use other mounting structures or no mounting structures at all. The RAN comprises Fifth Generation (5G) RAN, LTE RAN, gNodeB, eNodeB, NB-IoT access nodes, LP-WAN base station, wireless relay, WIFI access nodes, Bluetooth access node, and/or some other type of wireless network transceiver. Wireless UE 101 and RANs 111-112 comprise antennas, amplifiers, filters, modulation, analog/digital interfaces, microprocessors, software, memories, transceivers, bus circuitry, and the like. Network controller 121 comprises network functions like an Access and Mobility Management function (AMF), Policy Control Function (PCF), and Network Slice Selection Function (NSSF). User plane 122 comprises a network function like a User Plane Function (UPF). UE 101, RANs 111-112, network controller 121, and user plane 122 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
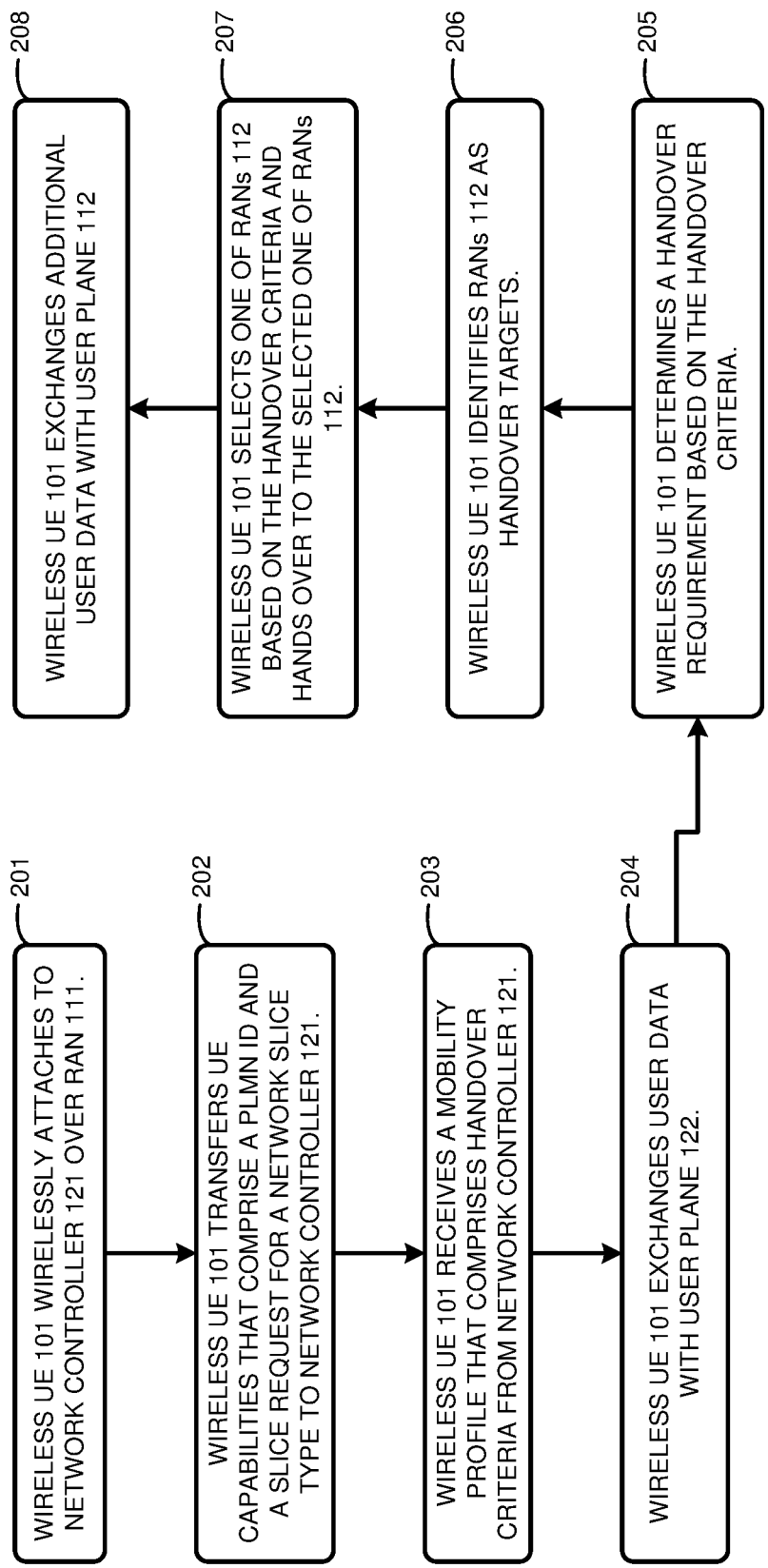
FIG. 2 illustrates an exemplary operation of the wireless communication network to handover the wireless UE.

FIG. 2 illustrates an exemplary operation of wireless communication network 100 to hand over wireless UE 101. The operation may vary in other examples. Wireless UE 101 wirelessly attaches to network controller 121 over RAN 111 (201). Wireless UE 101 transfers UE capabilities that comprise a PLMN ID and a slice request for a network slice type to network controller 121 (202). Wireless UE 101 receives a mobility profiles that comprises handover criteria from network controller 121 (203). Wireless UE 101 exchanges user data with user plane 122 (204). Wireless UE 101 determines a handover requirement based on the handover criteria (205). Wireless UE 101 identifies RANs 112 as handover targets (206). Wireless UE 101 selects one of RANs 112 based on the handover criteria and hands over to the selected one of RANs 112 (207). Wireless UE 101 exchanges additional user data with user plane 122 (208).

Figure 3:
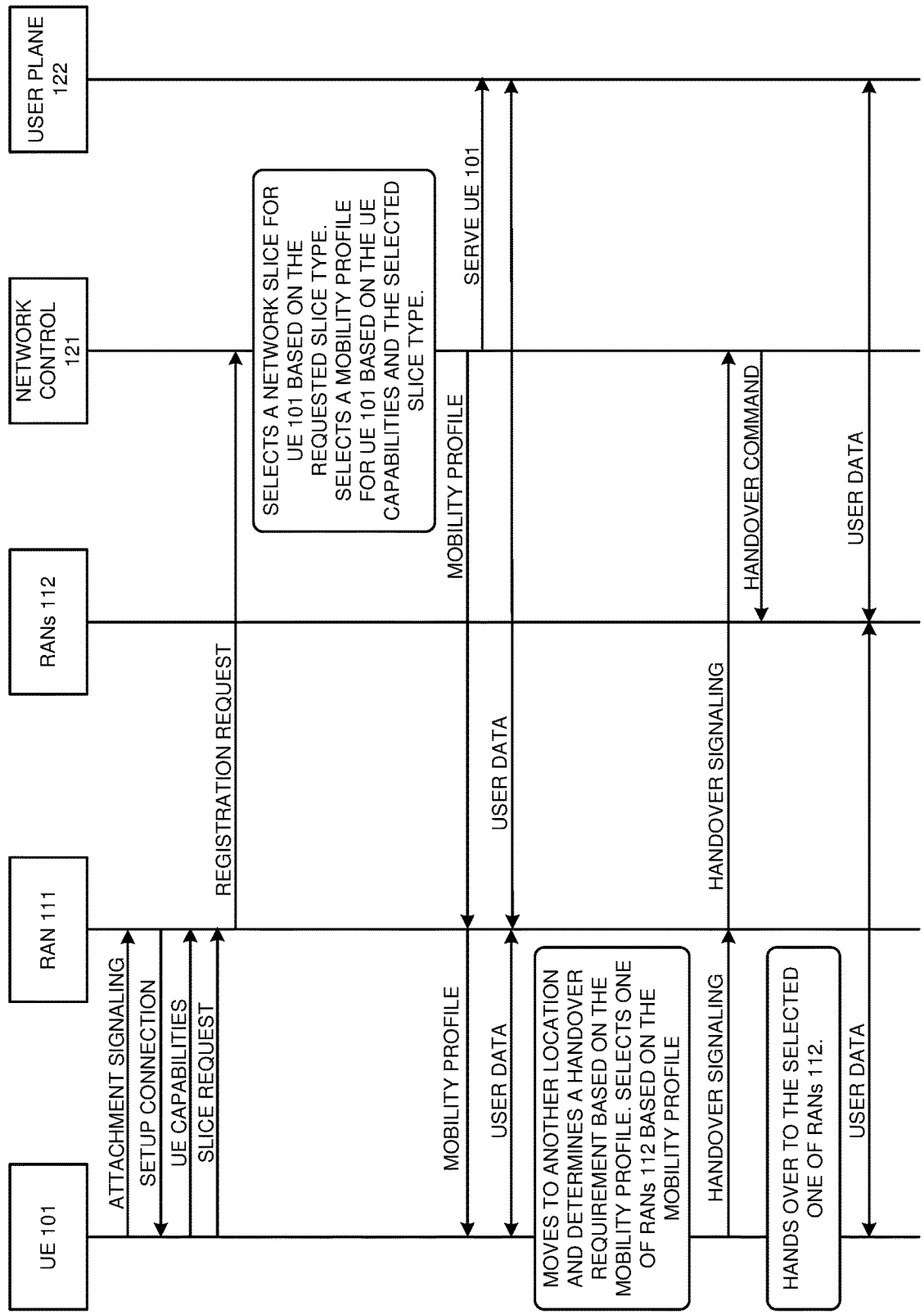
FIG. 3 illustrates another exemplary operation of the wireless communication network to handover the wireless UE.

FIG. 3 illustrates an exemplary operation of wireless communication network 100 to hand over wireless UE 101. The operation may vary in other examples. UE 101 transfers attachment signaling to RAN 111. RAN 111 establishes a wireless connection with UE 101 in response to the attachment signaling. UE 101 transfers UE capabilities and a slice request to RAN 111. The UE capabilities comprise PLMN IDs, RAT types, UE device type, frequency bands, and frequency bandwidths, and/or other UE capabilities for wireless UE 101. The slice request comprises Single-Network Slice Selection Assistance Information (S-NSSAI) for a network slice type. RAN 111 transfers a registration request to network controller 121 that indicates the UE capabilities and slice request. Network controller 121 selects a network slice for UE 101 based on the requested slice type. For example, network controller 121 may select the requested network slice type when that slice type is available and may select a different network slice type when the requested slice type is not available. Network controller 121 selects a mobility profile for UE 101 based on the UE capabilities and the selected slice type. The mobility profile comprises handover criteria for UE 101. The handover criteria comprise a handover threshold, preferred RAT types, preferred frequency bands, and/or other types of handover metrics. Network controller 121 transfers the mobility profile to RAN 111 and directs user plane 122 to serve UE 101. RAN 111 forwards the mobility profile to UE 101. UE 101 wirelessly receives the mobility profile from RAN 111. UE 101 wirelessly exchanges user data with user plane 122 over RAN 111.

Wireless UE 101 moves to another geographic location and determines a handover requirement based on the mobility profile. For example, the mobility profile may indicate a handover threshold and UE 101 may determine that the received signal power from RAN 111 is below the handover threshold. UE 101 identifies RANs 112 as handover candidates. For example, UE 101 may measure pilot signals from RANs 112 and determine that the signal strength of the pilot signals are adequate for handover. UE 101 selects one of RANs 112 for handover based on the handover criteria from the mobility profile. For example, UE 101 may wirelessly receive Master Information Blocks (MIBs) from RANs 112 that indicate frequency bands and RATs for RANs 112, and UE 101 may select one of RANs 112 that has the frequency band and RAT that match the preferred frequency band and RAT in the handover criteria in the mobility profile. UE 101 transfers handover signaling to network controller 121 that indicates the selected one of RANs 112. Network controller transfers a handover command to the selected one of RANs 112. UE 101 hands over to the selected one of RANs 112 and exchanges user data with the selected one of RANs 112. The selected one of RANS 112 exchanges user data with user plane 122.

Figure 4:
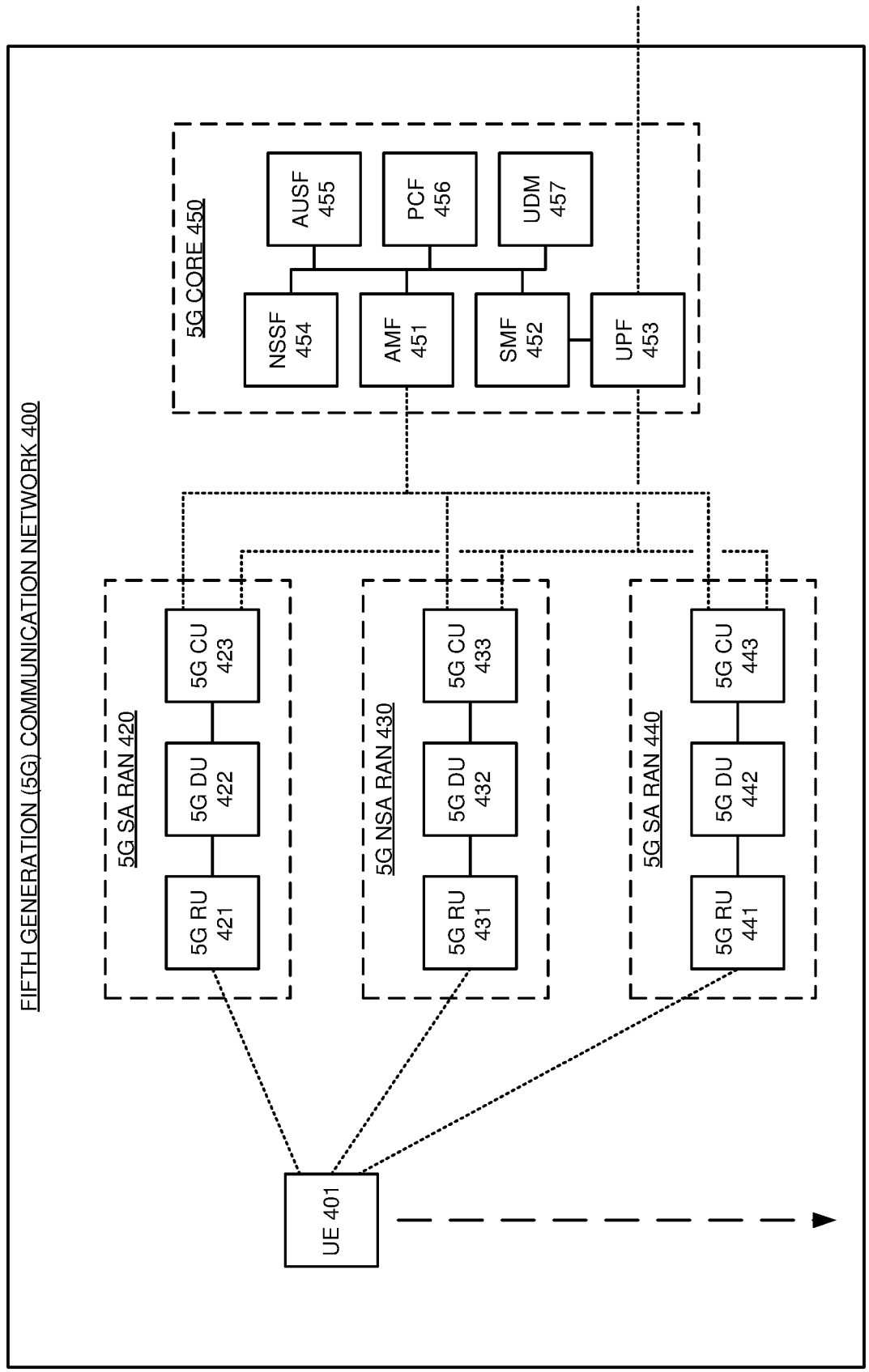
FIG. 4 illustrates a Fifth Generation (5G) communication to handover a 5G UE.

FIG. 4 illustrates Fifth Generation (5G) communication network 400 to handover UE 401. 5G communication network 400 comprises an example of wireless communication network 100, although network 100 may differ. 5G communication network 400 comprises 5G UE 401, 5G Stand Alone (SA) RAN 420, 5G Non-Stand Alone (NSA) RAN 430, 5G SA RAN 440 and 5G network core 450. 5G SA RAN 420 comprises 5G Radio Unit (RU) 421, 5G Distributed Unit (DU) 422, and 5G Centralized Unit (CU) 423. 5G NSA RAN 430 comprises RU 431, 5G DU 432, and 5G CU 433. 5G SA RAN 440 comprises 5G RU 441, 5G DU 442, and 5G CU 443. 5G network core 450 comprises Access and Mobility Management Function (AMF) 451, Session Management Function (SMF) 452, User Plane Function (UPF) 453, Network Slice Selection Function (NSSF) 454, Authenticating Server Function (AUSF) 455, Policy Control Function (PCF) 456, and Unified Data Management (UDM) 457. Other network functions and network elements are typically present in network core 450 but are omitted for clarity.

UE 401 wirelessly attaches to RU 421 and wirelessly transfers attachment signaling to CU 423 over RU 421 and DU 422. CU 423 establishes an RRC connection with UE 401 over DU 422 and RU 421. UE 401 transfers a registration request to CU 423 over RU 421 and DU 422. The registration request comprises an S-NSSAI for a slice type and Information Elements (IEs) that comprise UE capabilities. For example, the slice type may comprise an Ultra-Reliable Low Latency Communications (URLLC) type, a Guaranteed Bit Rate (GBR) type, an Enhanced Mobile Broadband (eMBB) type, Massive Machine Type Communications (mMTC) type, and/or some other type of network slice type. For example, the UE capabilities may comprise PLMN IDs, a 5G Stand Alone (SA) capability, a 5G non-SA (NSA) capability, a Long Term Evolution (LTE) capability, device type, handover requirements, bandwidth capabilities, band capabilities, and/or some other type of UE capability. The IEs comprise codes that assist 5G network core 450 in identifying the different capabilities of UE 401. For example, a first IE for UE 401 may comprise a unique code that indicates a 5G SA capability while a second IE for UE 401 may indicate a PLMN ID for UE 401. CU 423 receives the registration request and forwards the registration request to AMF 451.

AMF 451 receives the registration request for UE 401. In response, AMF 451 transfers an authentication request to AUSF 455. AUSF 455 interacts with UDM 457 to authenticate UE 401 and notifies AMF 451 of the authentication. Responsive to the authentication, AMF 451 requests UE context for UE 401 from UDM 457. UDM 457 retrieves the UE context for UE 401. The UE context indicates authorized services for UE 401 like Data Network Names (DNNs), Quality-of-Service (QoS) values, and authorized Protocol Data Unit (PDU) session types, authorized slice types, and the like. UDM 457 transfers the UE context to AMF 451.

AMF 451 receives the UE context from UDM 457. AMF 451 interacts with NSSF 454 to select a network slice for UE 401. AMF 451 transfers the S-NSSAI requested by UE 401 to NSSF 454. NSSF 454 determines UE 401 is authorized for the requested slice type. For example, AMF 451 may indicate the UE context to NSSF 454 to determine if UE 401 is authorized to use the requested slice. NSSF 454 selects a network slice for UE 401 based on the requested S-NSSAI and the availability of the slice type of the S-NSSAI. NSSF 454 transfers a slice ID for the selected network slice to AMF 451. AMF receives the slice ID from NSSF 454. AMF 451 interacts with PCF 456 to retrieve network policies and select a mobility profile for UE 401. AMF 451 indicates the slice ID for the selected network slice and the Information Elements (IEs) from UE 401 to PCF 456. PCF 456 maps the slice ID and IEs to a mobility profile for UE 401. For example, PCF 456 may identify the PLMN ID for UE 401 based on the IEs and select a mobility profile for UE 401 based on the PLMN ID and the slice ID. In some examples, PCF 456 utilizes other IEs that indicate other UE capabilities to select the mobility profile for UE 401. The mobility profile comprises handover criteria like handover thresholds, preferred RAT types, preferred bands, and/or other types of handover criteria for UE 401 to apply when handing over. PCF 456 transfers the mobility profile and network polices to AMF 451.

AMF 451 receives the mobility profile and network policies for UE 401 from PCF 456. AMF 451 processes the UE context and network policies and responsively selects SMF 452 to serve UE 401. AMF 451 directs SMF 452 to serve UE 401 and transfers the UE context and selected slice ID to SMF 452. SMF 452 selects UPF 453 to serve the network slice to UE 401 based on the UE context and slice ID. For example, the slice type may comprise URLLC and SMF 452 may determine that UPF 453 can support URLLC services. SMF 452 directs UPF 453 to establish the data session for UE 401. SMF 452 generates and transfers session context that indicates UPF 453 to AMF 451. AMF 451 transfers the session context and mobility profile to CU 423. CU 423 forwards the session context and mobility profile to UE 401 over DU 422 and RU 421. UE 401 uses the session context to start a data session over the network slice with UPF 453. UE 401 wirelessly exchanges user data with CU 423 over RU 421 and DU 422. CU 423 exchanges user data with UPF 453. UPF 453 exchanges the user data with external systems.

UE 401 moves to another geographic location. UE 401 determines a handover requirement based on the mobility profile. The mobility profile indicates a handover threshold. UE 401 determines when the received signal strength from 5G SA RAN 420 falls below the handover threshold. When the signal strength falls below the threshold, UE 401 identifies 5G NSA RAN 430 and 5G SA RAN 440 as handover candidates. For example, UE 401 may measure the signal strength of the pilot signals from RANs 430 and 440 to determine if their signal strength can support wireless data services. UE 401 applies the handover criteria in the mobility profile to select one of RANs 430 and 440 to handover to. For example, the mobility profile may indicate 5G SA as the preferred RAT type for UE 401 and UE 401 may select 5G SA RAN 440 because it comprises the preferred RAT type. UE 401 transfers handover signaling that indicates the selected one of RANs 430 and 440 to AMF 451 over 5G SA RAN 420. AMF 451 directs the selected one of RANs 430 and 440 to serve UE 401. AMF 451 directs SMF 452 to serve UE 401 over the selected one of RANs 430 and 440. SMF 452 controls UPF 453 to transfer the data session from 5G SA RAN 420 to the selected one of RANs 430 and 440. UE 401 hands over and exchanges user data with the selected one of RANs 430 and 440. The selected one of RANs 430 and 440 exchanges user data with UPF 453. UPF 453 exchanges the user data with external systems.

In some examples, PCF 456 selects a mobility profile based on the load. AMF 451 indicates the slice ID, the IEs from UE 401, and UE loads for RANs 420, 430, and 440 to PCF 456. PCF 456 maps the slice ID and IEs to mobility profiles for UE 401. PCF 456 determines the loads for the RANs associated with each of the mobility profiles. PCF 456 selects one of the mobility profiles based on its associated load. For example, 5G SA RAN 440 may be heavily loaded and 5G NSA RAN 430 may be lightly loaded and PCF 456 may responsively select a mobility profile with 5G NSA as the preferred RAT type. PCF 456 transfers the mobility profile and network polices to AMF 451. AMF 451 transfers the mobility profile to UE 401. In some examples, the mobility profile may rank the different RAT types by load and UE 401 may select the RANs for handover based on the ranks.

Figure 5:
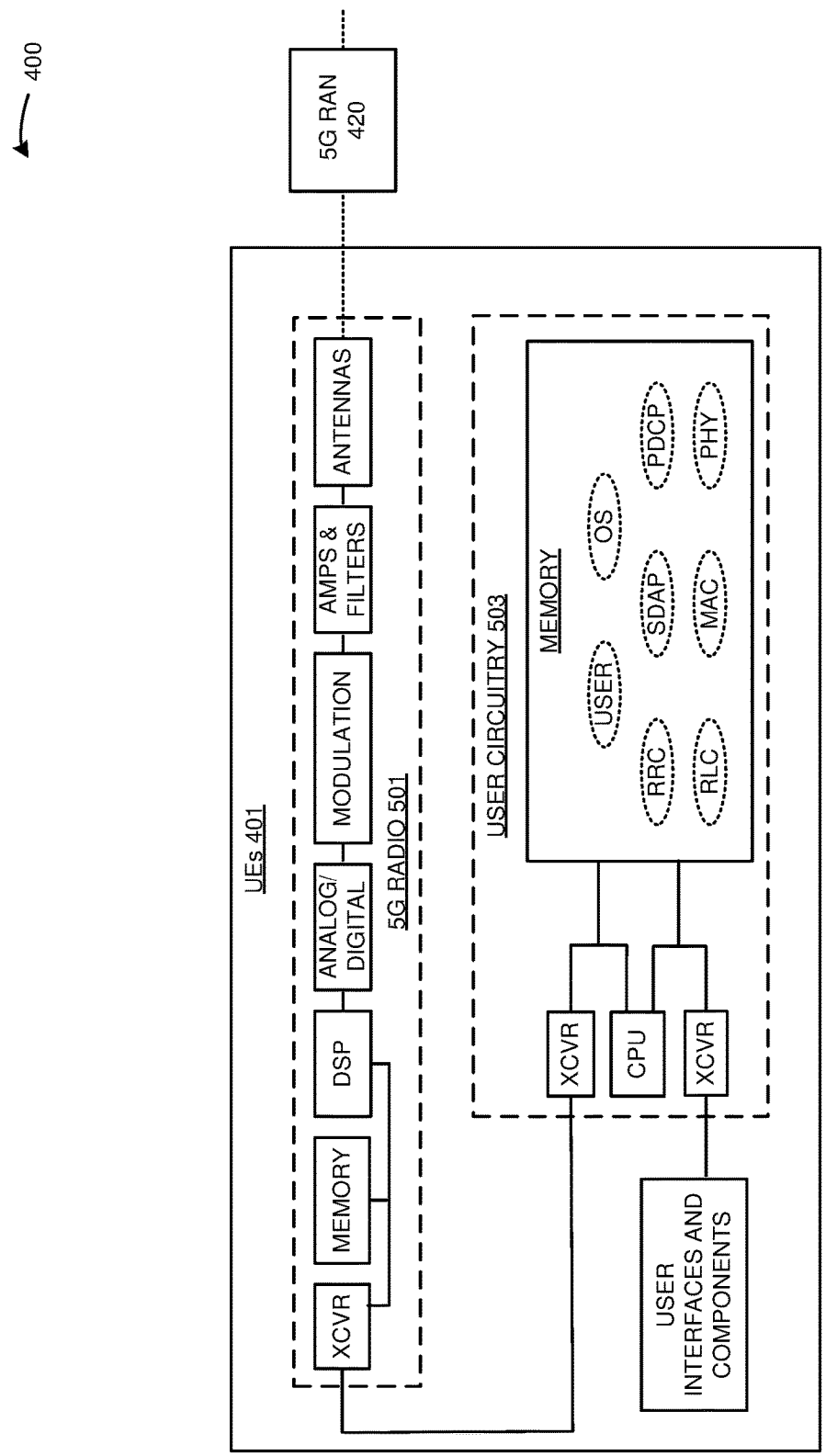
FIG. 5 illustrates the 5G UE in the 5G communication network.

FIG. 5 illustrates 5G UE 401 in 5G communication network 400. UE 401 comprises an example of UE 101 illustrated in FIG. 1, although UE 101 may differ. UE 401 comprises 5G radio 501 and user circuitry 502. Radio 501 comprises antennas, amplifiers, filters, modulation, analog-to-digital interfaces, Digital Signal Processors (DSP), memory, and transceivers that are coupled over bus circuitry. User circuitry 502 comprises memory, CPU, user interfaces and components, and transceivers that are coupled over bus circuitry. The memory in user circuitry 502 stores an operating system (OS), user applications (USER), and network applications for Physical Layer (PHY), Media Access Control (MAC), Radio Link Control (RLC), Packet Data Convergence Protocol (PDCP), Service Data Adaptation Protocol (SDAP), and Radio Resource Control (RRC). In some examples, user circuitry 502 additionally or alternatively stores LTE network applications for PHY, MAD, RLC, PDCP, and RRC. The antenna in radio 501 is wirelessly coupled to 5G RAN 420 over a 5GNR link. A transceiver in radio 501 is coupled to a transceiver in user circuitry 502. A transceiver in user circuitry 502 is typically coupled to the user interfaces and components like displays, controllers, and memory.

In radio 501, the antennas receive wireless signals from 5G RAN 420 that transport downlink 5GNR signaling and data. The antennas transfer corresponding electrical signals through duplexers to the amplifiers. The amplifiers boost the received signals for filters which attenuate unwanted energy. Demodulators down-convert the amplified signals from their carrier frequency. The analog/digital interfaces convert the demodulated analog signals into digital signals for the DSPs. The DSPs transfer corresponding 5GNR symbols to user circuitry 502 over the transceivers. In user circuitry 502, the CPU executes the network applications to process the symbols and recover the downlink 5GNR signaling and data. The 5GNR network applications receive new uplink signaling and data from the user applications. The network applications process the uplink user signaling and the downlink 5GNR signaling to generate new downlink user signaling and new uplink 5GNR signaling. The network applications transfer the new downlink user signaling and data to the user applications. The 5GNR network applications process the new uplink 5GNR signaling and user data to generate corresponding uplink 5GNR symbols that carry the uplink 5GNR signaling and data.

In radio 501, the DSP processes the uplink 5GNR symbols to generate corresponding digital signals for the analog-to-digital interfaces. The analog-to-digital interfaces convert the digital uplink signals into analog uplink signals for modulation. Modulation up-converts the uplink analog signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5G RANs 420 that transport the uplink signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid ARQ (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching, scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

Figure 6:
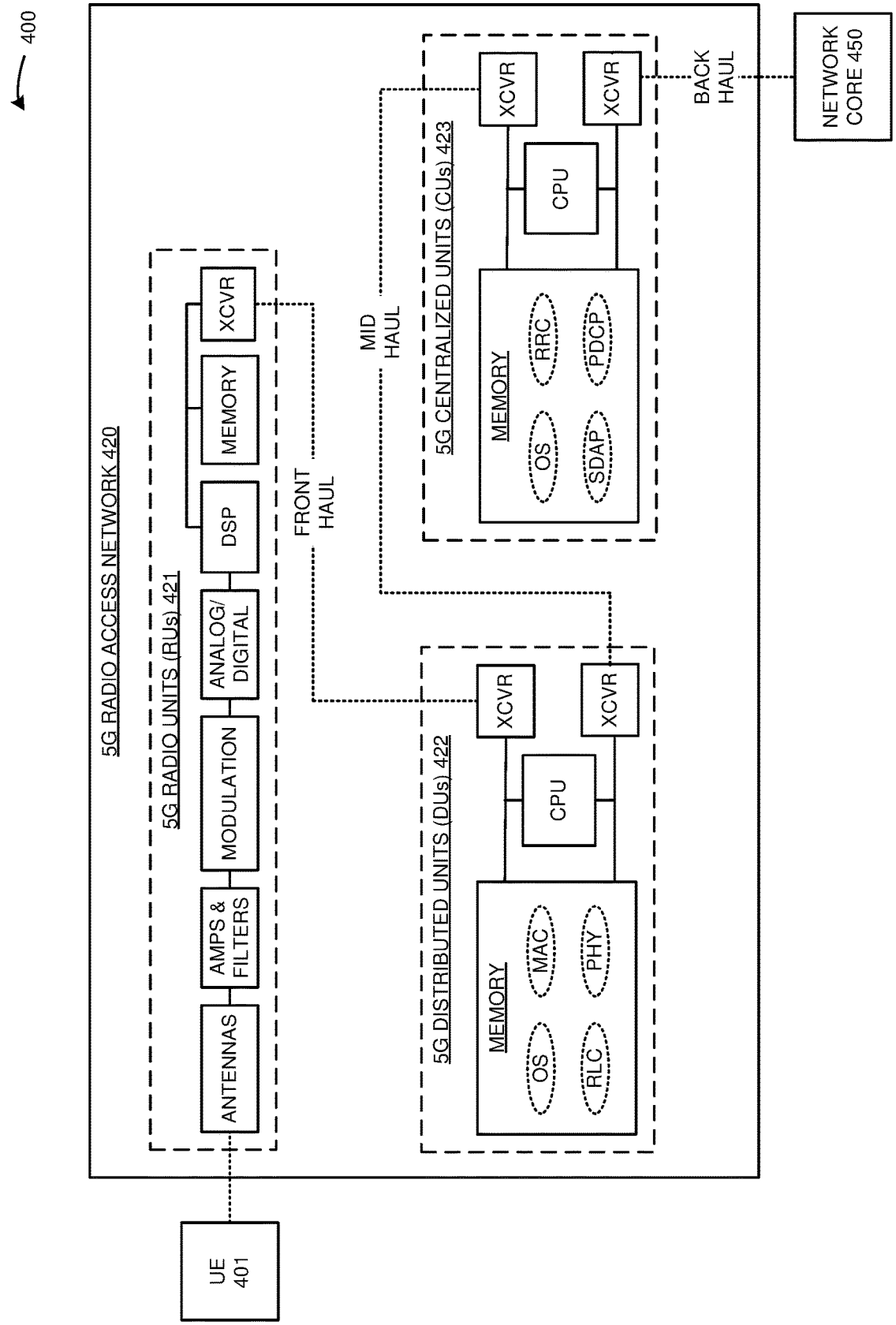
FIG. 6 illustrates a 5G Radio Access Network (RAN) in the 5G communication network.

FIG. 6 illustrates 5G RU 421, 5G DU 422, and 5G CU 423 in 5G SA RAN 420. RU 421, DU 422, and CU 423 comprise an example of the RANs 411-412 illustrated in FIG. 1, although the RANs 411-412 may differ. RANs 430 and 440 may be similar to 5G SA RAN 420. RU 421 comprises antennas, amplifiers, filters, modulation, analog-to-digital interfaces, DSP, memory, and transceivers (XCVRs) that are coupled over bus circuitry. UE 401 is wirelessly coupled to the antennas in RU 421 over 5GNR links. Transceivers in 5G RU 421 are coupled to transceivers in 5G DU 422 over fronthaul links like enhanced Common Public Radio Interface (eCPRI). The DSP in RU 421 executes its operating systems and radio applications to exchange 5GNR signals with UE 401 and to exchange 5GNR data units with DU 422.

For the uplink, the antennas receive wireless signals from UE 401 that transport uplink 5GNR signaling and data. The antennas transfer corresponding electrical signals through duplexers to the amplifiers. The amplifiers boost the received signals for filters which attenuate unwanted energy.

Demodulators down-convert the amplified signals from their carrier frequencies. The analog/digital interfaces convert the demodulated analog signals into digital signals for the DSP. The DSP transfers corresponding 5GNR symbols to DU 422 over the transceivers.

For the downlink, the DSP receives downlink 5GNR symbols from DU 422. The DSP processes the downlink 5GNR symbols to generate corresponding digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered electrical signals through duplexers to the antennas. The filtered electrical signals drive the antennas to emit corresponding wireless signals to 5G UE 401 that transport the downlink 5GNR signaling and data.

DU 422 comprises memory, CPU, and transceivers that are coupled over bus circuitry. The memory in 5G DU 422 stores operating systems and 5GNR network applications like PHY, MAC, and RLC. CU 423 comprises memory, CPU, and transceivers that are coupled over bus circuitry. The memory in CU 423 store an operating system and 5GNR network applications like PDCP, SDAP, and RRC. Transceivers in 5G DU 422 are coupled to transceivers in RUs 421 over front-haul links. Transceivers in DUs 422 are coupled to transceivers in CUs 423 over mid-haul links. A transceiver in CU 423 is coupled to network core 450 over backhaul links.

RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, guard-insertion/guard-deletion, parsing/de-parsing, control insertion/removal, interleaving/de-interleaving, FEC encoding/decoding, channel coding/decoding, channel estimation/equalization, and rate matching/de-matching, scrambling/descrambling, modulation mapping/de-mapping, layer mapping/de-mapping, precoding, RE mapping/de-mapping, FFTs/IFFTs, and DFTs/IDFTs. PDCP functions include security ciphering, header compression and decompression, sequence numbering and re-sequencing, de-duplication. SDAP functions include QoS marking and flow control. RRC functions include authentication, security, handover control, status reporting, QoS, network broadcasts and pages, and network selection.

Figure 7:
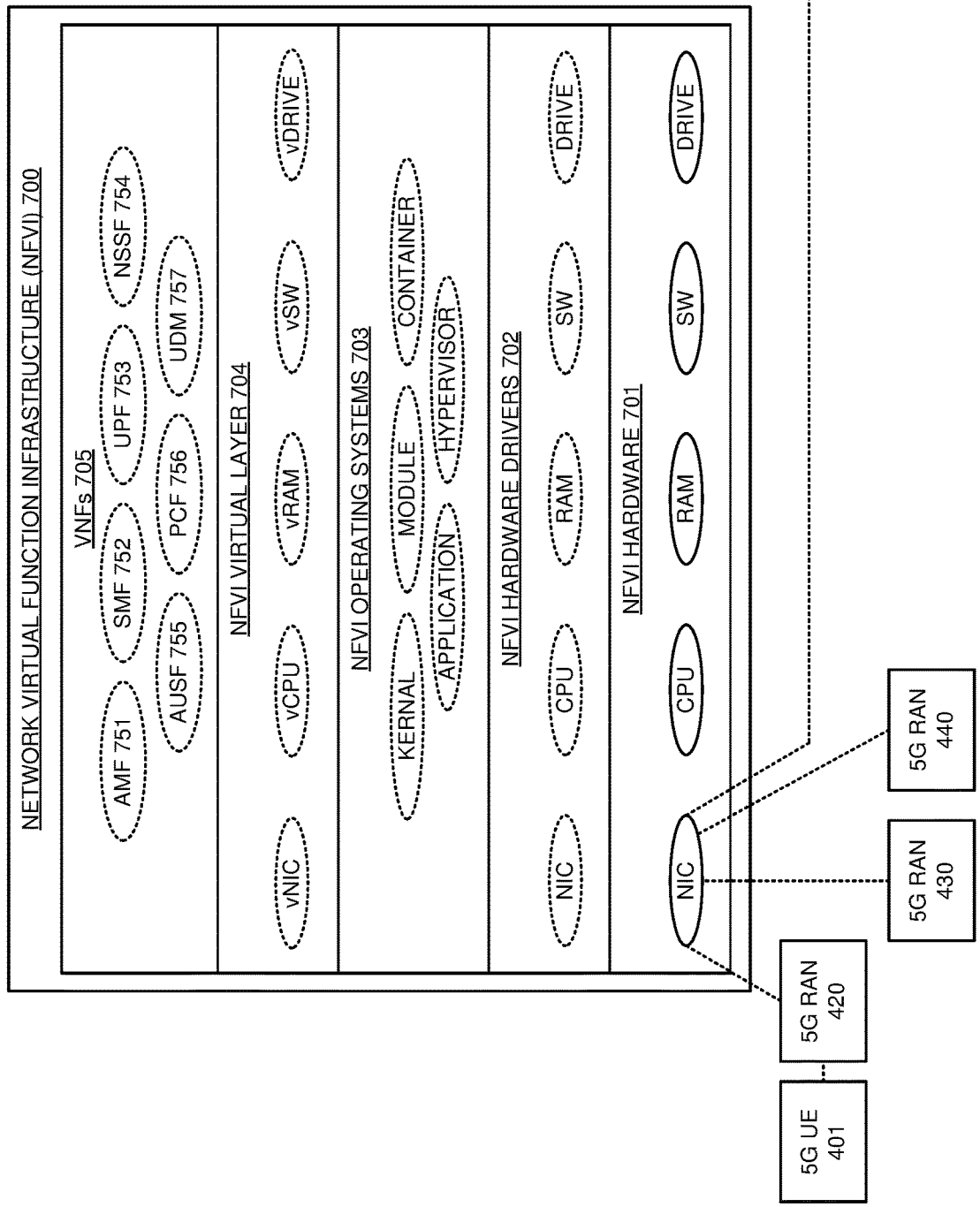
FIG. 7 illustrates a Network Function Virtualization Infrastructure (NFVI) in the 5G communication network.

FIG. 7 illustrates Network Function Virtualization Infrastructure (NFVI) 700 in 5G communications network 400. NFVI 700 comprises an example of network controller 121 and user plane 122 illustrated in FIG. 1, although network controller 121 and user plane 122. NFVI 700 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise AMF 751, SMF 752, UPF 753, NSSF 754, AUSF 755, PCF 756, and UDM 757. Additional VNFs and network elements like Network Exposure Function (NEF), Network Repository Function (NRF), and Unified Data Registry (UDR) are typically present but are omitted for clarity. NFVI 700 may be located at a single site or be distributed across multiple geographic locations. The NIC in NFVI hardware 701 is coupled to 5G SA RAN 420, 5G NSA RAN 430, 5G SA RAN 440 and to external systems. NFVI hardware 701 executes NFVI hardware drivers 702, NFVI operating systems 703, NFVI virtual layer 704, and NFVI VNFs 705 to form AMF 451, SMF 452, UPF 453, NSSF 454, AUSF 455, PCF 456, and UDM 457.

Figure 8:
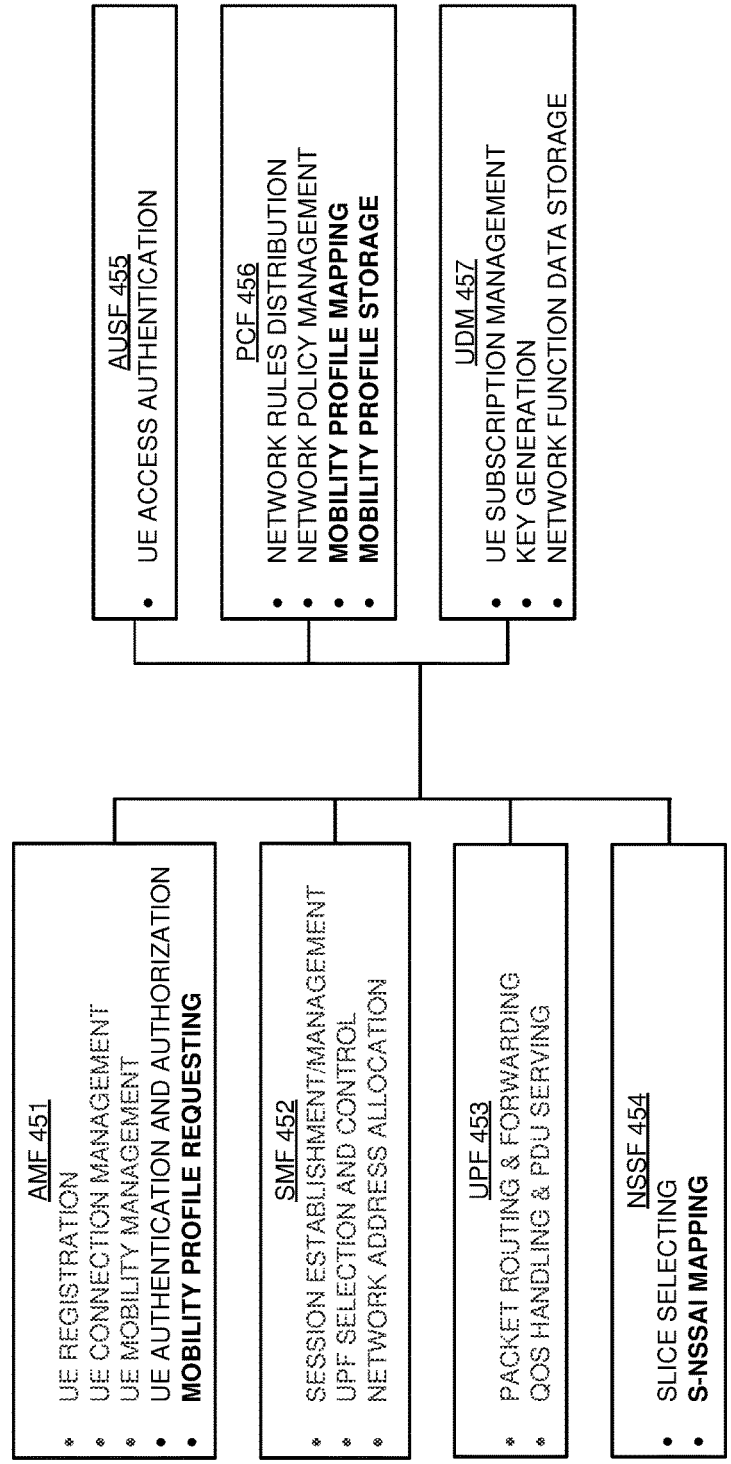
FIG. 8 further illustrates the NFVI in the 5G communication network.

FIG. 8 further illustrates NFVI 700 in 5G communication network 400. AMF 451 performs UE registration and connection, UE connection/mobility management, UE authentication and authorization, and mobility profile requesting. SMF 452 performs session establishment and management, UPF selection and control, and network address allocation. UPF 453 perform packet routing & forwarding, QoS handling, PDU interconnection, and mobility anchoring. NSSF 454 performs slice selecting and S-NSSAI mapping, AUSF 455 performs UE access authentication. PCF 456 performs network rules management and distribution and network policy management, mobility profile mapping, and mobility profile storage. UDM 457 performs UE subscription and registration management, UE key generation, and network function data storage.

In this example, UE 401 hands over to 5G NSA RAN 430, however the operation may differ in other examples. AMF 451 receives a registration request for UE 401 that comprises an S-NSSAI for a GBR slice and IEs. The IEs indicate a device type, RAT capability for 5G SA and 5G NSA, frequency band capability, and bandwidth capability. In response, AMF 451 interacts with AUSF 455 to authenticate UE 401. Responsive to the authentication, AMF 451 requests UE context for UE 401 from UDM 457. UDM 457 transfers the UE context to AMF 451.

AMF 451 receives the UE context from UDM 457. AMF 451 selects NSSF 454 to resolve the slice request. AMF 451 transfers the S-NSSAI requested by UE 401 to NSSF 454. NSSF 454 determines UE 401 is authorized for the GBR slice type based on the UE context. NSSF 454 selects a GBR slice for UE 401 based on the S-NSSAI and the availability of the GBR slice. NSSF 454 transfers a slice ID for the GBR slice to AMF 451. AMF receives the slice ID. AMF 451 interacts with PCF 456 to retrieve network policies and select a mobility profile for UE 401. AMF 451 transfers the slice ID for the GBR slice, the IEs from UE 401, and UE loads by RAT to PCF 456. PCF 456 maps the slice ID and IEs to a mobility profile for UE 401. PCF 456 selects a mobility profile based on the device type of UE 401, RAT capabilities of UE 401, frequency band capability and bandwidth capability, PLMN ID for UE 401, and the UE loads by RAT. The mobility profile comprises a handover threshold, 5G NSA RAT preference, and preferred bands. PCF 456 transfers the mobility profile and network polices to AMF 451.

AMF 451 receives the mobility profile and network policies for UE 401 from PCF 456. AMF 451 directs SMF 452 to serve UE 401 based on the UE context and slice ID. transfers the UE context and slice ID to SMF 452. SMF 452 selects UPF 453 to serve the GBR slice to UE 401. SMF 452 controls UPF 453 to establish the data session for UE 401. SMF 452 transfers session context that indicates UPF 453 to AMF 451. AMF 451 transfers the session context and mobility profile to UE 401 over RAN 420. UE 401 uses the session context to start a data session over the GBR slice with UPF 453. UPF 453 exchanges the user data with external systems and with UE 401.

UE 401 determines a handover requirement based on handover threshold in the mobility profile. UE 401 determines the received signal strength from 5G SA RAN 420 is below the handover threshold. UE 401 measures the signal strength of RANs 430 and 440 and determines the signal strengths are sufficient for handover. UE 401 applies the handover criteria in the mobility profile and responsively selects 5G NSA RAN 430 UE 401 for handover. For example, 5G NSA RAN 430 may broadcast a Master Information Block (MIB) that indicates RAN properties and UE 401 may compare the RAN properties to the handover criteria. UE 401 transfers handover signaling to AMF 451 that indicates 5G NSA RAN 430.

AMF 451 directs 5G NSA RAN 430 to serve UE 401. AMF 451 directs SMF 452 to serve UE 401 over 5G NSA RAN 430. SMF 452 controls UPF 453 to transfer the data session from 5G SA RAN 420 to 5G NSA RAN 430. UE 401 hands over and exchanges user data with 5G NSA RAN 430. 5G NSA RAN 430 exchanges user data with UPF 453. UPF 453 exchanges the user data with external systems.

Figure 9:
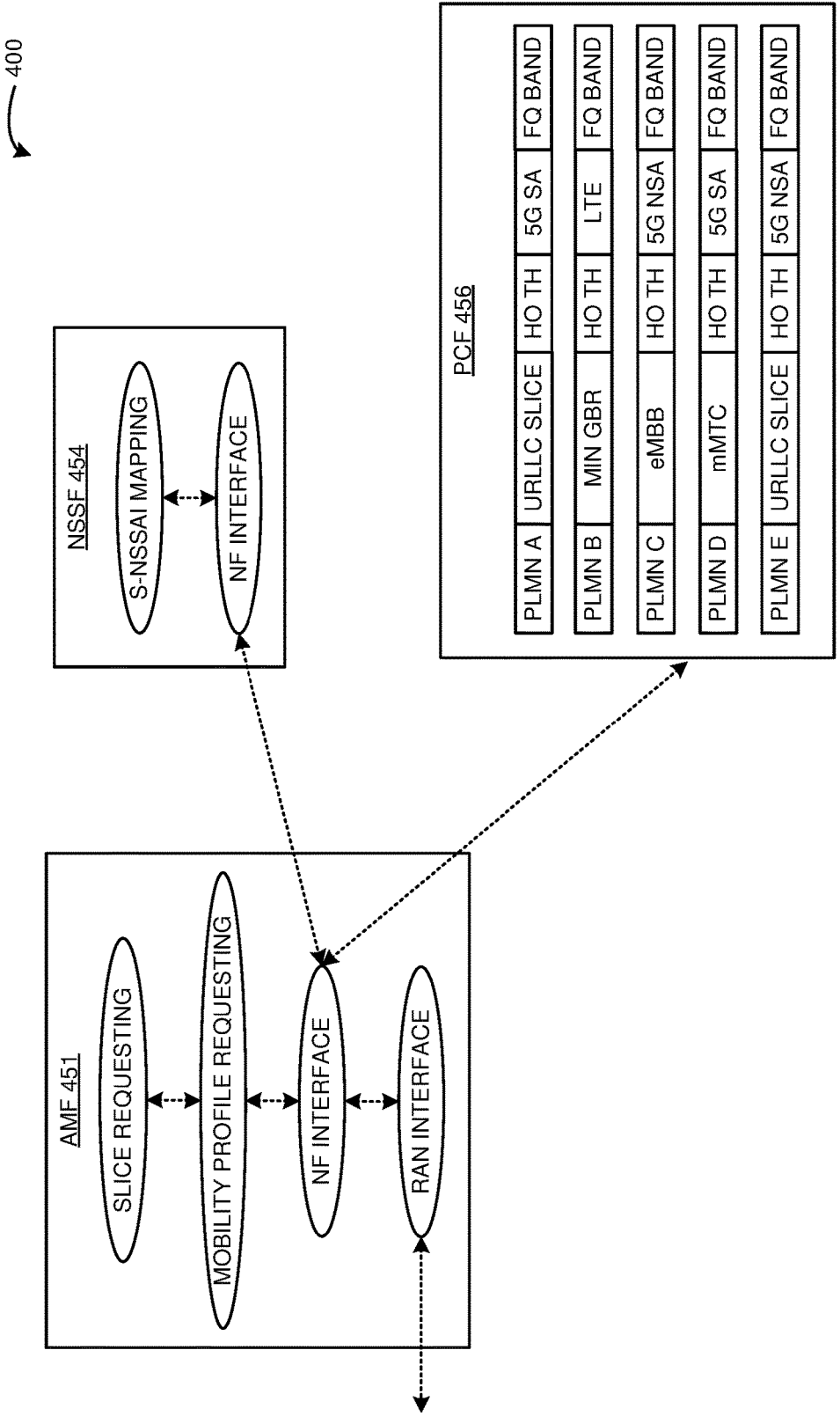
FIG. 9 illustrated network functions and mobility profiles in the 5G communication network.

FIG. 9 illustrates AMF 451, AUSF 455, and PCF 456 in 5G communication network 400. AMF 451, AUSF 455, and PCF 456 comprise an example of network controller 121, although network controller 121 may differ. AMF 451 comprises applications for slice requesting, mobility profile requesting, an NF interface, and a RAN interface. AUSF 455 comprises applications for S-NSSAI mapping and an NF interface. PCF 456 stores mobility profiles for UE 401. The mobility profiles are classified by PLMN and slice type and comprise a handover threshold (HO TH), a RAT type preference, and a frequency band preference. The mobility profile may comprise additional and/or other handover criterions than the ones illustrated in FIG. 9. AMF 451 receives an S-NSSAI for a network slice type from UE 401. AMF 451 also receives IEs from UE 401 that correspond to UE capabilities for UE 401 like PLMN IDs, device type, RAT type, and frequency band. AMF 451 and NSSF 454 interact to resolve the slice request from UE 401. AMF 451 indicates the selected slice type and IEs to PCF 456. PCF 456 correlates the slice type and IEs to a mobility profile. PCF 456 transfers the mobility profile to AMF 451 which transfers the mobility profile to UE 401. UE 401 uses the mobility profile to select RANs when handing over.

Figure 10:
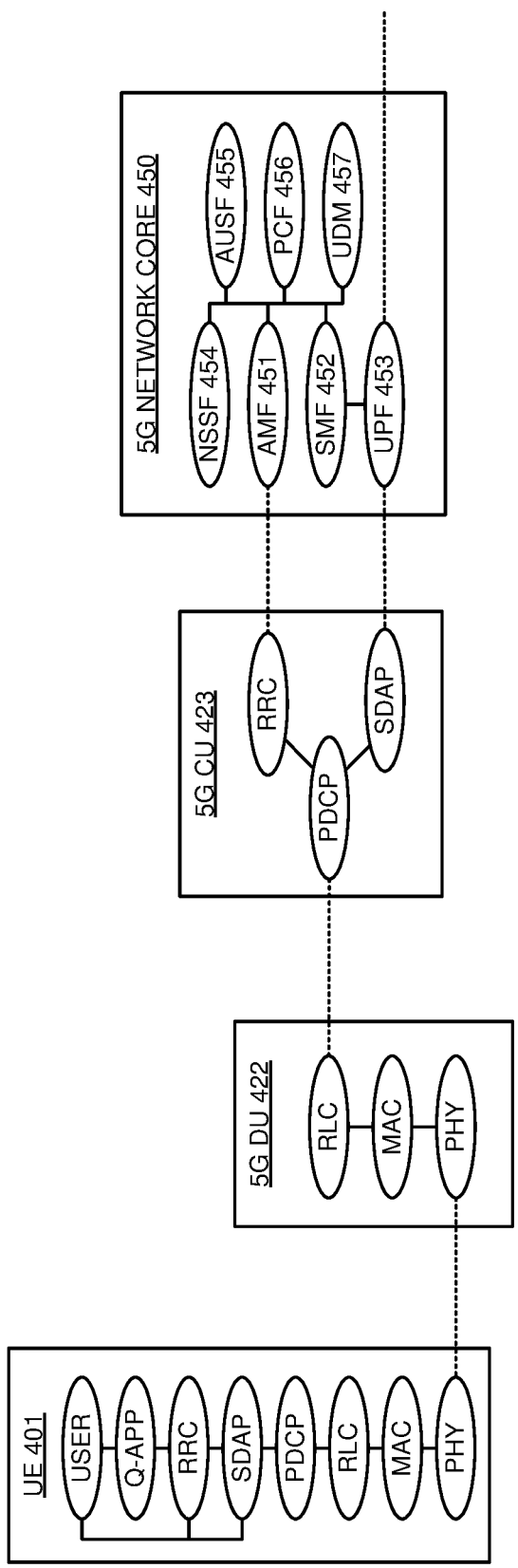
FIG. 10 illustrates an exemplary operation of the 5G communication network to handover the 5G UE.

FIG. 10 illustrates an exemplary operation of 5G communication network 400 to handover UE 401. The operation may vary in other examples. The RRC in UE 401 wirelessly attaches to the RRC in CU 423 over the PDCPs, RLCs, MACs, and PHYs. The RRC in CU 423 establishes an RRC connection with the RRC in UE 401 over the PDCPs, RLCs, MACs, and PHYs. The RRC in UE 401 transfers a registration request to the RRC in CU 423 over the PDCPs, RLCs, MACs, and PHYs. The registration request comprises an S-NSSAI for a URLLC slice and Information Elements (IEs) that comprise UE capabilities. The UE capabilities comprise a PLMN ID, a 5G Stand Alone (SA) capability, a device type, and band capability. The RRC in CU 423 receives the registration request and forwards the registration request to AMF 451. AMF 451 receives the registration request for UE 401. AMF 451 requests UE authentication from AUSF 455. AUSF 455 authenticates the identity of UE 401 and notifies AMF 451. Responsive to the authentication, AMF 451 retrieves UE context that indicates authorized services for UE 401 from UDM 457.

Responsive to the authorization, AMF 451 transfers the requested S-NSSAI to NSSF 454. NSSF 454 determines UE 401 is authorized for the URLLC slice. NSSF 454 selects a network slice for UE 401 based on the requested S-NSSAI and the availability of the URLLC slice. NSSF 454 transfers a slice ID for the selected network slice to AMF 451. AMF 451 requests a mobility profile from PCF 456. AMF 451 indicates the slice ID for the URLLC slice and the IEs for UE 401 to PCF 456. PCF 456 maps the slice ID and IEs for the PLMN ID, device type, RAT capability, and band capability to a mobility profile for UE 401. The mobility profile comprises a handover threshold, preferred RAT type, preferred bands. PCF 456 transfers the mobility profile and network polices to AMF 451.

AMF 451 directs SMF 452 to serve UE 401 and transfers the UE context and slice ID to SMF 452. SMF 452 determines UPF 453 can support the URLLC slice and directs. SMF 452 directs UPF 453 to establish the data session for UE 401. SMF 452 generates and transfers session context that indicates UPF 453 to AMF 451. AMF 451 transfers the session context and mobility profile to the RRC in CU 423. The RRC in CU 423 forwards the session context and mobility profile to the RRC in UE 401 over the PDCPs, RLCs, MACs, and PHYs. The RRC in UE 401 directs the SDAP in UE 401 to start a data session over the URLLC slice with UPF 453. The SDAP in UE 401 exchanges user data with the SDAP in CU 423 over the PDCPs, RLCs, MACs, and PHYs based on the session context. The SDAP in CU 423 exchanges user data with UPF 453. UPF 453 exchanges the user data with external systems.

UE 401 moves to another geographic location. The RRC in UE 401 determines a handover requirement based on the mobility profile. The RRC in UE 401 directs the PHY to measure the received signal strength from 5G SA RAN 420. The PHY measures the received signal strength and indicates the signal strength to the RRC. The RRC determines the signal strength is below the handover threshold from the mobility profile. In response, the RRC in UE 401 directs the PHY to measures received signal strengths from 5G NSA RAN 430 and 5G SA RAN 440 to identify handover candidates. The RRC in UE 401 applies the handover criteria in the mobility profile to select one of RANs 430 and 440 for handover. The RRC in UE 401 selects 5G SA RAN 440 for handover based on the mobility profile. The RRC in UE 401 transfers handover signaling that indicate 5G SA RAN 440 to the RRC in CU 423 over the PDCPs, RLCs, MACs, and PHYs. The RRC in CU 423 directs RAN 440 to serve UE 401. AMF 451 directs SMF 452 to hand over UE 401 to 5G SA RAN 440. SMF 452 controls UPF 453 to transfer the data session from 5G SA RAN 420 to 5G SA RAN 440. UE 401 hands over and exchanges user data with the UPF 453 over 5G SA RAN 440. UPF 453 exchanges the user data with external systems.

The wireless data network circuitry described above comprises computer hardware and software that form special-purpose network circuitry to hand over a wireless UE. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to hand over a wireless UE.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to handover a wireless User Equipment (UE), the method comprising:
   selecting a network slice for the wireless UE;
   selecting handover criteria for the wireless UE based on the selected network slice;
   serving the wireless UE over the selected network slice and a source Radio Access Network (RAN); and
   detecting a UE handover from the source RAN to a target RAN based on the handover criteria, and in response, serving the wireless UE over the selected network slice and the target RAN.

2. The method of claim 1 wherein selecting the handover criteria for the wireless UE based on the selected network slice comprises selecting the handover criteria for the wireless UE based on the selected network slice and UE capability information for the wireless UE.

3. The method of claim 1 wherein selecting the handover criteria for the wireless UE based on the selected network slice comprises selecting the handover criteria for the wireless UE based on the selected network slice and a Public Land Mobile Network (PLMN) for the wireless UE.

4. The method of claim 1 wherein selecting the handover criteria for the wireless UE based on the selected network slice comprises selecting the handover criteria for the wireless UE based on the selected network slice and a device type for the wireless UE.

5. The method of claim 1 wherein selecting the handover criteria for the wireless UE based on the selected network slice comprises selecting the handover criteria for the wireless UE based on the selected network slice and a radio access technology for the wireless UE.

6. The method of claim 1 wherein the handover criteria comprises a handover threshold.

7. The method of claim 1 wherein the handover criteria comprises a frequency band.

8. The method of claim 1 wherein the handover criteria comprises a radio access technology.

9. A method of operating a wireless communication network to handover a wireless User Equipment (UE), the method comprising:
   a network core receiving signaling from the wireless UE over a source Radio Access Network (RAN) that indicates a Public Land Mobile Network Identifier (PLMN ID) and a network slice type for the wireless UE;
   the network core selecting a network slice for the wireless UE based on the slice type and selecting handover criteria for the wireless UE based on the selected network slice and the PLMN ID;
   the network core transferring the handover criteria to the wireless UE over the source RAN and directing the selected network slice to serve the wireless UE over the source RAN;
   the selected network slice serving the wireless UE over the source RAN;
   the network core detecting a UE handover from the source RAN to a target RAN based on the handover criteria, and in response, directing the selected network slice to serve the wireless UE over the target RAN; and
   the selected network slice serving the wireless UE over the target RAN.

10. The method of claim 9 wherein the network core receiving the signaling from the wireless UE over the source RAN that indicates the PLMN ID and a network slice type for the wireless UE comprises and Access and Mobility Management Function (AMF) receiving the signaling from the wireless UE over the source RAN that indicates the PLMN ID and a network slice type for the wireless UE.

11. The method of claim 9 wherein the network core selecting the network slice for the wireless UE based on the slice type comprises a Network Slice Selection Function (NSSF) selecting the network slice for the wireless UE based on the slice type.

12. The method of claim 9 wherein the network core selecting the handover criteria for the wireless UE based on the selected network slice and the PLMN ID comprises a Policy Control Function (PCF) selecting the handover criteria for the wireless UE based on the selected network slice and the PLMN ID.

13. A wireless communication network to handover a wireless User Equipment (UE), the wireless communication network comprising:
   a network controller configured to select a network slice for the wireless UE;
   the network controller further configured to select handover criteria for the wireless UE based on the selected network slice;
   the selected network slice configured to serve the wireless UE over a source Radio Access Network (RAN);
   the network controller further configured to detect a UE handover from the source RAN to a target RAN based on the handover criteria;
   the selected network slice further configured to serve the wireless UE over the target RAN in response to the network controller detecting a UE handover from the source RAN to a target RAN based on the handover criteria.

14. The wireless communication network of claim 13 wherein the network controller is further configured to select the handover criteria for the wireless UE based on the selected network slice and UE capability information for the wireless UE to select the handover criteria for the wireless UE based on the selected network slice.

15. The wireless communication network of claim 13 wherein the network controller is further configured to select the handover criteria for the wireless UE based on the selected network slice and a Public Land Mobile Network (PLMN) for the wireless UE to select the handover criteria for the wireless UE based on the selected network slice.

16. The wireless communication network of claim 13 wherein the network controller is further configured to select the handover criteria for the wireless UE based on the selected network slice and a device type for the wireless UE to select the handover criteria for the wireless UE based on the selected network slice.

17. The wireless communication network of claim 13 wherein the network controller is further configured to select the handover criteria for the wireless UE based on the selected network slice and a radio access technology for the wireless UE to select the handover criteria for the wireless UE based on the selected network slice.

18. The wireless communication network of claim 13 wherein the handover criteria comprises a handover threshold.

19. The wireless communication network of claim 13 wherein the handover criteria comprises a frequency band.

20. The wireless communication network of claim 13 wherein the handover criteria comprises a radio access technology.

* * * * *